INVENTOR.
MAURICE P. SIEGER
JAMES A. ADAIR
BY
THEIR ATTORNEY

INVENTOR.
MAURICE P. SIEGER
JAMES A. ADAIR
BY *Henry C. Westin*
THEIR ATTORNEY

INVENTOR.
MAURICE P. SIEGER
JAMES A. ADAIR
BY
THEIR ATTORNEY 3,190,099
ROLL CHANGING APPARATUS
Maurice F. Sieger and James R. Adair, Pittsburgh, Pa.,
assignors to United Engineering and Foundry Company,
Pittsburgh, Pa., a corporation of Pennsylvania
Filed Sept. 28, 1962, Ser. No. 226,859
6 Claims. (Cl. 72—238)

This invention relates to a roll changing apparatus for use in connection with a rolling mill and while it may be employed with many different types of such mills, it is particularly applicable for use in conjunction with rolling mills for producing beams, structural members and the like.

Present-day mills employed for producing such products and, particularly, universal mills, may be conveniently classified relative to the system employed for changing the rolls of the mills, i.e., as those in which the entire mill is removed from its operative position and those in which only the rolls thereof are removed and the mill itself remains in its operative position.

In changing the rolls of a mill that fall within the first classification, the entire mill, including the rolls but excluding the drive thereof, is lifted bodily from its operative position and replaced by a second mill. This second mill is sometimes referred to as a setup mill and includes a new set of rolls. While in employing this system of roll changing lost time is kept to a minimum, it obviously entails an extremely large capital outlay, both in the way of additional setup mills and in providing a crane or cranes of sufficient capacity to handle the massive mills. As a result, this system has limited application.

To avoid such extravagant capital expense, many mill users employ mills that fall within the second classification, wherein the mill is not removable from its operative position, but the rolls thereof are changed by use of a roll carrying device, such as a C hook, porter bar or sling assembly. In certain types of these mills, the housings thereof must also be spread apart prior to the removal of the rolls. In this system the rolls must be individually removed and replaced, which, of course, entails an attendant appreciable loss in production time and in the need of the services of a crane or cranes for an appreciable period of time.

This loss in production time is even greater in those cases where the cranes must carry the rolls any substantial distance to and from the mill. In addition to these losses in time, there are many other losses incident to the employment of C hooks, etc., such as the time necessary to lock the chocks from turning during their movement through the mill and in axially adjusting the rolls and guides once the rolls are inserted into the mill.

Another disadvantage in the system employing a C hook, etc., is that in most instances the roll necks of the horizontal rolls must be made longer than necessary in order that the C hooks, etc. can engage the ends of the rolls. In addition to this disadvantage, this lengthening of the rolls prevents ease in adjusting the rolls axially relative to each other.

The present invention provides an apparatus for changing the rolls of a mill and is particularly adapted for use in conjunction with a universal type mill, having the significant advantages over prior procedure of roll changing in that it considerably reduces the production time losses incident to this operation, the amount of time a crane or cranes are required, and allows a more simply constructed mill and roll design to be employed. It thus permits the maximum production of the mill to be realized, without requiring the removal of the mill from its operative position in order to change its rolls.

In addition to these advantages, should the mill arrangement include tandemly arranged stands, such as universal and edger stands employed in rolling beams, then in that event the present invention provides an apparatus for simultaneously changing the rolls of the number of mills at substantially no loss in production time over what is experienced in changing the rolls of only one stand.

Furthermore, roll changing in accordance with the present invention does not require the employment of one or more cranes during the actual roll changing procedure, and has the additional advantage of permitting new roll assemblies to be brought to the mill and stored prior to the discontinuance of the operation thereof and the worn roll assemblies to be removed at a convenient time after the mill has been placed back in operation. Since the crane is not needed during the actual roll changing operation, it will be available for maintenance work that would otherwise have to be held in abeyance, thus extending even further the losses in production time.

According to the present invention as employed, for example in conjunction with a universal beam mill, an apparatus is provided including a rig for each horizontal roll. Each of these rigs is constructed to receive and support a first and second roll assembly, in which connection means are provided for retracting from and inserting into the mill roll assemblies. Additional means are provided to move the rigs relative to the mill so that when the rigs are moved, the first roll assemblies will be moved away from the mill and the second roll assemblies will be automatically positioned relative to the mill in readiness for insertion therein.

The preferred form of the present invention also includes superimposed structures which are arranged at the operating side of and designed to extend beyond the mill. The upper structure provided for the rig that services the upper roll extends across the housing projection provided for one of the vertical rolls of the mill. These structures are arranged at such elevations relative to the horizontal rolls that the rigs carried thereon, when positioned in front of the mill, will present surfaces that will support and guide the roll assemblies during their retraction and insertion without necessitating any manipulation of the rolls during their movement in an axial direction. In some forms, the mill itself may be provided with means for supporting and guiding the roll assemblies during the initial period of the roll changing procedure, in which case the supporting and guiding surfaces of the rigs will cooperate with the supporting surfaces of the mill.

The preferred form of the invention also provides, in connection with the rig provided for the upper roll, two carriages, one designed to retract a first or worn roll assembly and the other arranged adjacent to the first, but designed to insert a second or replacement roll assembly. Common means is provided for moving both carriages in unison to their respective operative positions.

The rig for the lower roll, because of the particular construction characteristic of the mill in this location, can be made of a simpler construction than the one provided for the upper roll and in this case, no carriages are provided, but instead the rig is constructed with two roll receiving platforms for supporting the two roll assemblies. A means is provided for moving this rig and, hence, the platforms into their respective operative positions. In addition, a common means is provided for retracting from and inserting into the mill the roll assemblies.

In the case of the rig of the lower roll assembly, it is received in a recess at the operative side of the mill over which removable floor plates may be placed when the rig is not being used. In the case of the rig provided for the upper roll assembly, its supporting structure is made to extend away from the mill which allows the rig to be conveniently removed to an inoperative position permitting sufficient operating room for the workmen.

These various features and advantages, as well as others, will be more apparent from the following description when read in conjunction with the accompanying drawings of which:

FIGURE 9 is a partial elevational view taken on lines IX—IX of FIGURE 1.

With reference to these drawings there is illustrated a mill designed to roll wide flange beams comprising a roughing universal mill 11 and an adjacently arranged edger mill 12. It is deemed unnecessary for an understanding of the present invention to explain in detail the various components of these mills, although reference will be made to certain significant elements thereof.

*Universal mill*

Figure 6:
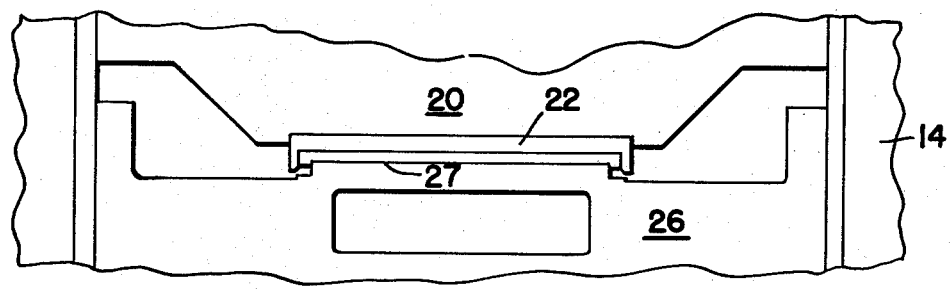

The universal mill 11 includes a pair of fixed spaced-apart housings 13 and 14 having the usual windows into which there are received cooperating upper and lower horizontal rolls 16 and 17 and vertical rolls 18 and 19. The vertical rolls are actually mounted in rigid wings 21 protruding from the housings 13 and 14, these rolls being shown in FIGURE 2 in their retracted inoperative positions. The rolls are equipped with the customary bearing-chock assemblies particular reference being made only to the assemblies 20 of the horizontal rolls 16 and 17 and in which connection the rolls and bearing chocks, as heretofore, are sometimes hereinafter referred to simply as "roll assemblies." As shown in FIGURES 6 and 9 the chocks 20 of the roll 16 have bearing lined surfaces 21 at their lower corners, whereas the chocks 20 of the roll 17 are provided with central bearing lined portions 22, the purposes of which will be explained later. As shown particularly in FIGURE 2, the horizontal rolls 16 and 17 are vertically adjusted through the agency of two pairs of screws 23.

Figure 2:
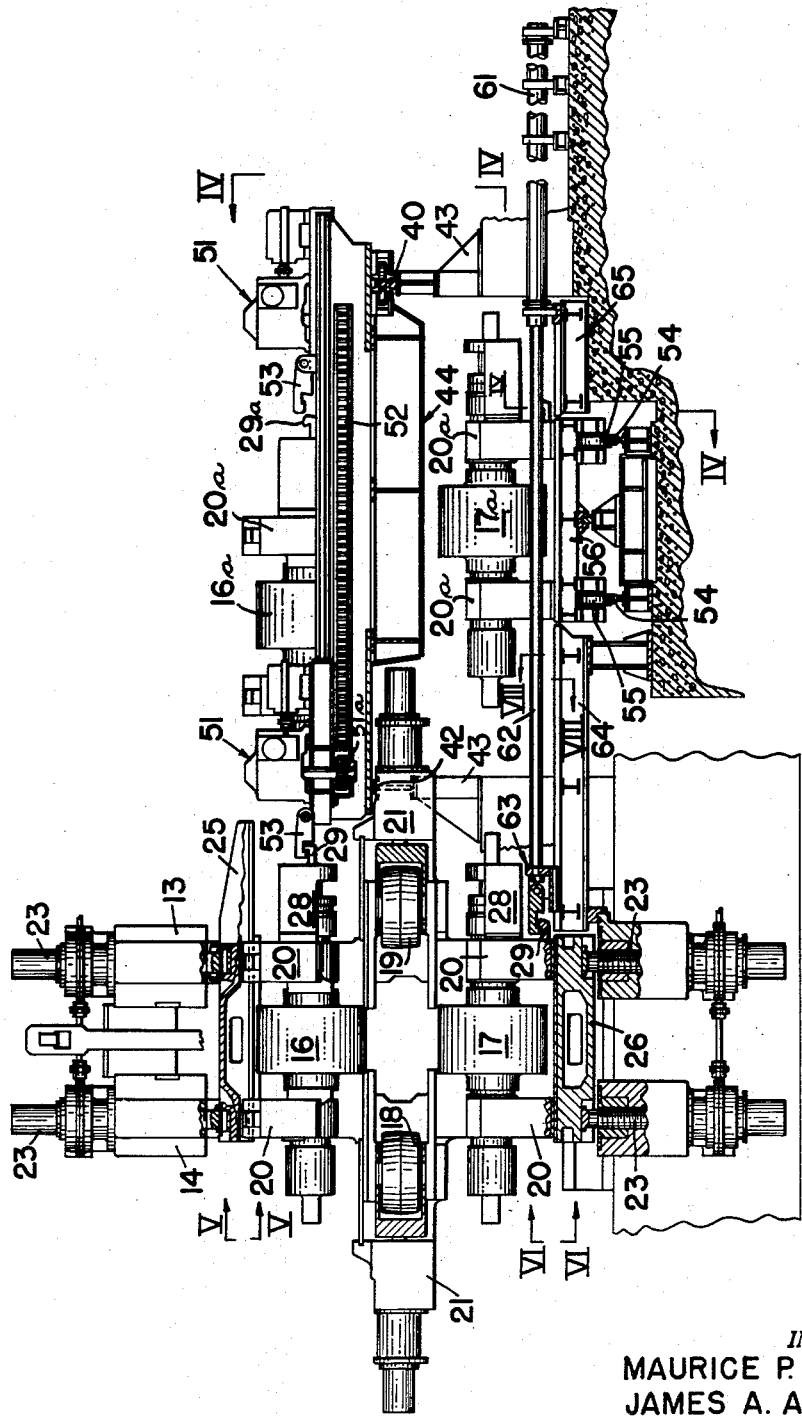
FIGURE 2 is a sectional view, taken on lines II—II of FIGURE 1 of the universal mill and its roll changing apparatus.
Figure 5:
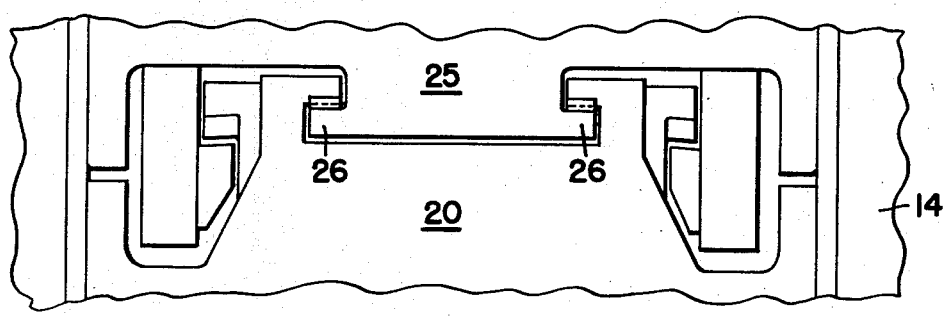
FIGURES 5 and 6 are enlarged partial elevation views of certain of the components of the universal mill taken at lines V—V and VI—VI, respectively of FIGURE 2.

In the particular design of the mill illustrated, the rolls 16 and 17 are supported by horizontally extending beams 25 and 26, respectively, which in turn, are carried by and move with the pairs of screws 23 and, thus, they can be brought to the predetermined separated roll changing position shown in FIGURE 2. As shown in FIGURE 5, the upper beam 25 is provided with two horizontal projections 26 extending from its opposite sides which serve as carrying and guiding surfaces for the chocks 20, it being noted that the upper portions of the chocks are formed with recesses that cooperate with the projections 26. As will be more fully appreciated later on, in the mill changing operation the chocks slide over the projection 26, for which purpose the contacting surfaces are provided with bearing liners.

As best shown in FIGURE 6, the lower beam, since it does not carry the weight of the roll assembly 17, but simply supports its weight, is provided with a bearing lined central portion 27 which engages the bearing liner 22 of the chocks and serves to support and guide the roll assembly 17 during both the rolling and roll changing operations. It is a feature of the employment of the beams 25 and 26 to make possible the employment of rolls of the shortest possible length for a given beam size to be produced, which feature is disclosed in a copending U.S. application of Maurice P. Sieger Serial No. 146,580 filed on October 20, 1961 entitled Beam and Plate Mill.

It will be noted that the ends of the rolls 16 and 17 on the operating side of the mill (i.e. the right side as one views FIGURES 1 and 2) are provided with thrust bearing assemblies 28, in which connection with reference to the upper roll 16, projecting from the bearing assembly is a pair of rigid hooks 29, best shown in FIGURE 2. A hook 29 is also provided for the lower roll 17, but in this case it is not formed on the thrust bearing assembly as in the case of the upper roll 16, but instead is made as an integral part of the operator side chock 20 as can be observed in again referring to FIGURE 2.

*The edger mill*

With respect to the construction of the edger mill 12, and in reference to FIGURES 3 and 4, this mill is generally similar to the construction of the universal mill 11 and for which reason no comment will be made of certain components thereof. There is one noticeable difference between the two mills, that being the omission in the edger mill of any vertical rolls. The rolls 31 and 32 of the edger mill by their chocks 33 engage horizontally arranged beams 34 and 35, respectively. The front lower chock 33 has a hook 33b formed as an integral part of the chock. In the particular construction of the mill shown, the upper beam 34 does not carry the weight of the top roll nor guide during roll changing, but only receives the rolling loads thereof; whereas, the lower beam 35 functions in a manner similar to the lower beam 26 of the universal mill. The pair of screws 36 of the edger mill are adjusted to separate the rolls 31 and 32 to a predetermined roll changing position at which time stools 37 are interposed between each of the chocks 33 of the rolls, thus serving to stabilize the roll assemblies and permit them to be withdrawn and inserted into the mill in pairs.

*Roll changing apparatus for the universal mill*

The aforesaid discussion of the salient elements of the mills 11 and 12 will better facilitate an understanding of the illustrated roll changing apparatus. With reference again to the drawings, the apparatus illustrated for changing the upper roll 16 of the universal mill 11 will be referred to first. As shown particularly in FIGURES 1 and 2, spaced away from the operating side of the mill is a track 40 arranged to run in a direction perpendicular to a plane containing the axes of the rolls 16 and 17. This track 40 is elevated relative to the base of the mill 11 so that its upper surface will fall in substantially the same elevation as the top surface of the wind 21 which contains the vertical roll 19. Immediately adjacent the mill and at the same elevation as the track 40, there is arranged a second track 41 but in this case it terminates on either side of the wing 21. An extension track 42, shown only on FIGURE 2, is mounted on and extends across the wing 21, thus providing a continuous running surface for the track 41.

Figure 4:
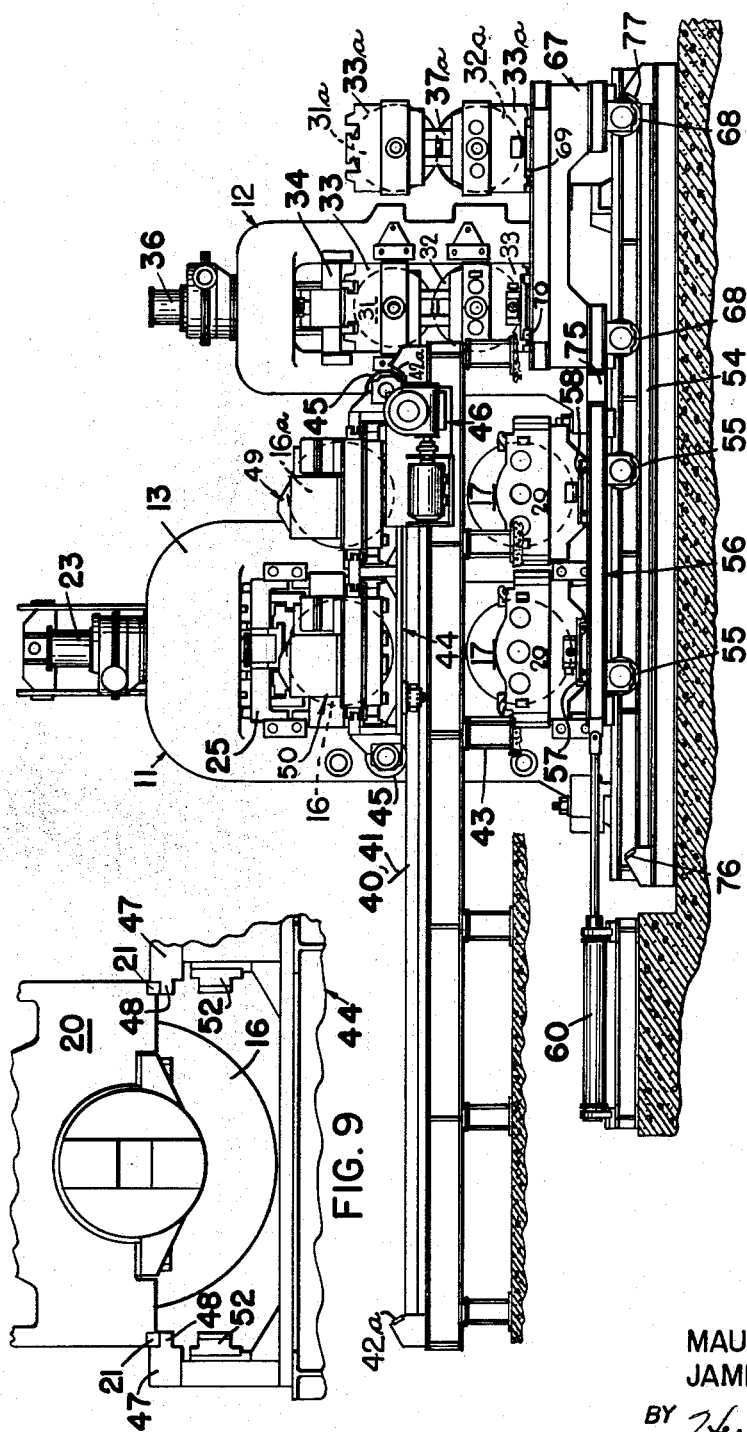
FIGURE 4 is a sectional view from the operating side of the mill arrangement taken on lines IV—IV of FIGURE 2.

As shown in FIGURE 4, the tracks 40 and 41 extend a substantial distance away from the operating side of the mill, the purpose of which will be explained later. The tracks are provided with substructures 43 for supporting a rig 44 to be now explained. This rig, as shown in FIGURES 2 and 4, has two pairs of wheels 45 that run over the tracks 40 and 41, one pair of which is driven by a motor-gear unit 46 and by which means the rig is advanced longitudinally relative to the mill. The two extreme positions of the rig are controlled by stops 42a which are secured to the ends of the tracks 40 and 41. For determining the proper position of the rig for the roll inserting phase of the roll changing operation, retractable stops or the like, not shown may be employed.

Figure 7:
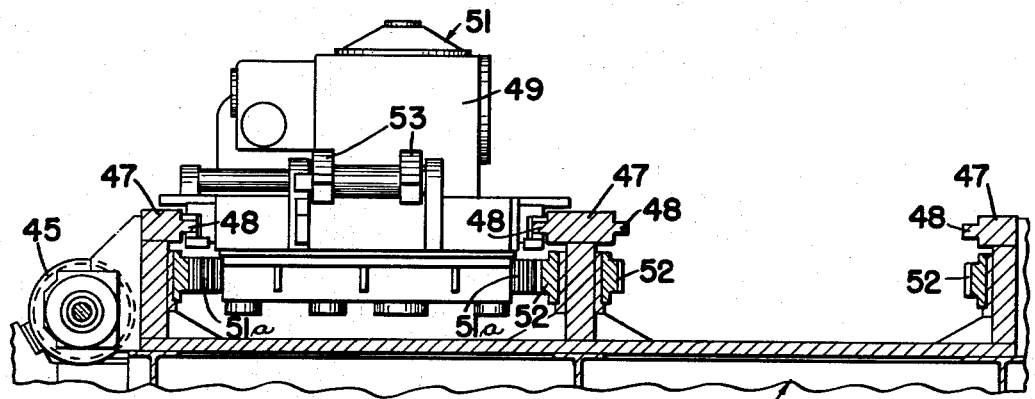
FIGURE 7 is a partial sectional view taken on lines VII—VII of FIGURE 1.

As best illustrated in FIGURE 7, the rig 44 is provided with three parallely arranged spaced-apart supporting members 47 which extend in a direction parallel to a plane containing the axis of the roll 16. These members are provided with horizontal projecting portions 48, the center one having two such portions. These members guide and support two independently operative carriages 49 and 50, the middle member 47 serving as a common support for each carriage, and in which connection the carriages have lined bearing recesses for cooperating with the projecting portions 48 of the members. It will be appreciated that the elevation of the members 47 and, particularly, the upper surfaces thereof are such that as the roll assembly 16 is retracted and inserted into the mill, the bearing liner 21 shown in FIGURE 9 of the chocks 20 will slide onto the portions 48 of the members 47.

In the drawings a new roll assembly 16a, 20a and 29a is shown resting in the carriage 49. Each of the carriages is advanced axially of the roll 16 by a motor-gear unit 51 including pinions 51a that mesh with racks 52 secured to the rig 44. The racks and pinions are shown best in FIGURE 7. To the front of the carriages, hooks 53 are pivotally secured which cooperate with hooks 29 or 29a formed on the thrust bearing assemblies 28 of the roll assemblies 16 or 16a. The hooks 53 also have pushing surfaces, thereby enabling the carriages to be used to insert the rolls into the mill as well as retract them therefrom.

In now referring to that part of the apparatus employed to change the lower roll 17, as shown in FIGURE 2, a second pair of tracks 54 is provided which is engaged by two pairs of wheels 55 belonging to a rig 56. This rig is constructed to handle two roll assemblies and for this purpose two platforms 57 and 58 formed by central supporting bearing-lined members are provided to guide and support the chocks 20 of the roll 17 as it is moved along the members. It will be noted in comparing FIGURES 4 and 6 that the platforms 57 and 58 are similar to the central bearing-lined portion 27 of the beam 26 and are engaged by a portion of the bearing liners 22 of the chocks 20 of the roll 17. In the drawings, a new roll assembly 17a and 20a is shown resting on the platform 58. The rig 56 is advanced to position one or the other of the platforms 57 and 58 relative to mill 11 by means of a piston cylinder assembly 60. The roll assemblies are inserted into the mill and removed therefrom by a piston cylinder assembly 61 which is provided with an extending rod 62. The outboard end of the rod 62 is connected to a hook assembly 63, the pivotal hook of which cooperates with the hook 29 provided on the front chock 20 of the lower roll assembly 17.

Figure 8:
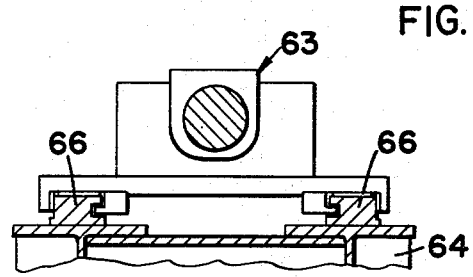
FIGURE 8 is a partial sectional view taken on lines VIII—VIII of FIGURE 2.

As best shown in FIGURE 2, on either side of the rig 55 and on the one side extending between the mill and the rig 56, stationary platforms 64 and 65 are provided. The platform 64, in addition to serving to support the chocks 20, also serves to guide the outboard end of the head of the piston cylinder assembly 61. This object is obtained as best shown in FIGURE 8 by providing two spaced-apart members 66 which support and guide the hook assembly 63. These members 66 are also engaged by a portion of the liners 22 of the chocks 20. The platform 65 is made long enough to permit the hook 63 to be retracted clear of the rig 56 so that the latter may be advanced relative to the mill.

*Roll changing rig for the edger mill*

Figure 1:
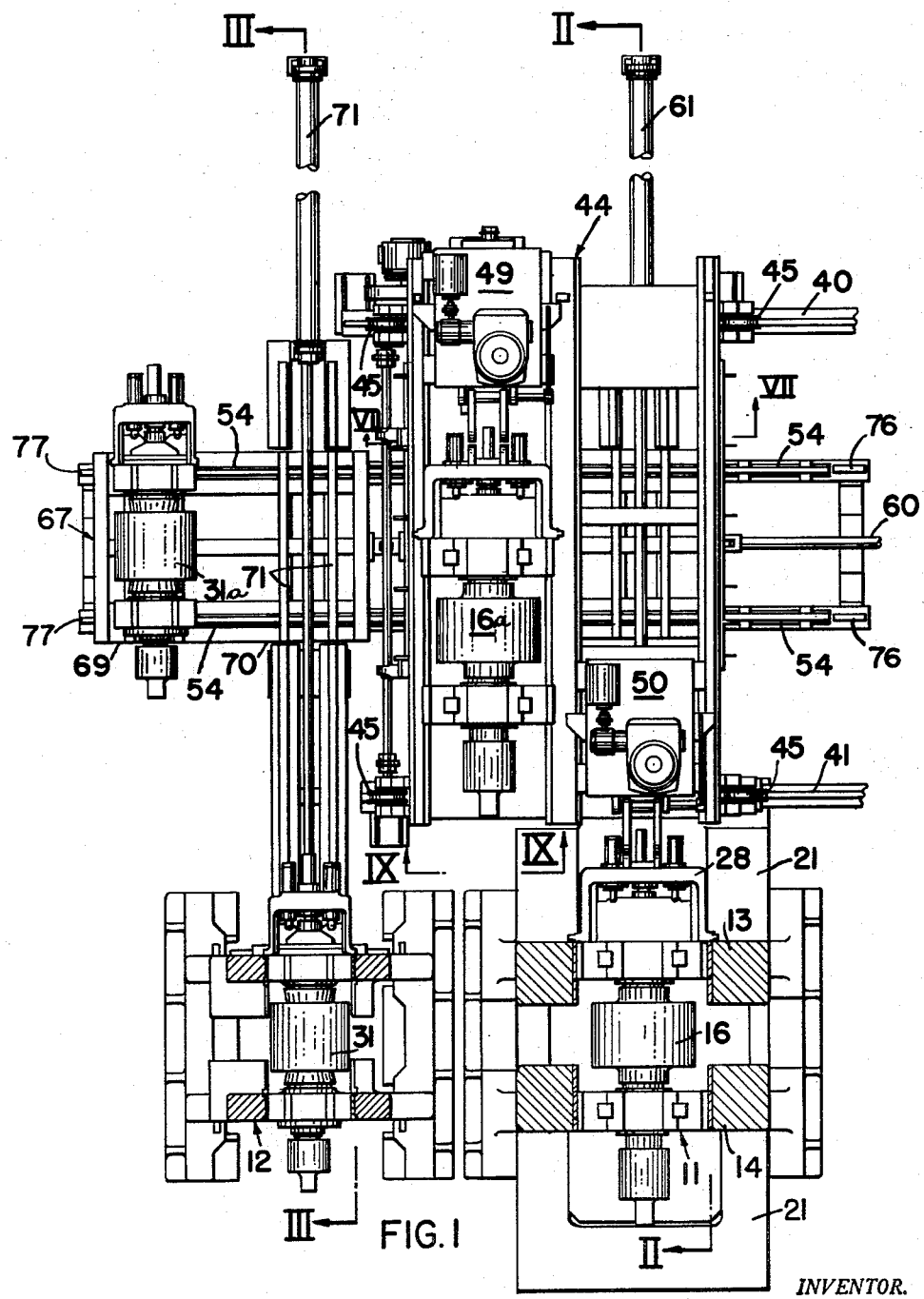
FIGURE 1 is a top plane view of a universal and edger mill arrangement, partially in section, and of roll changing apparatus incorporating the features of the present invention which is employed in conjunction with the mills.
Figure 3:
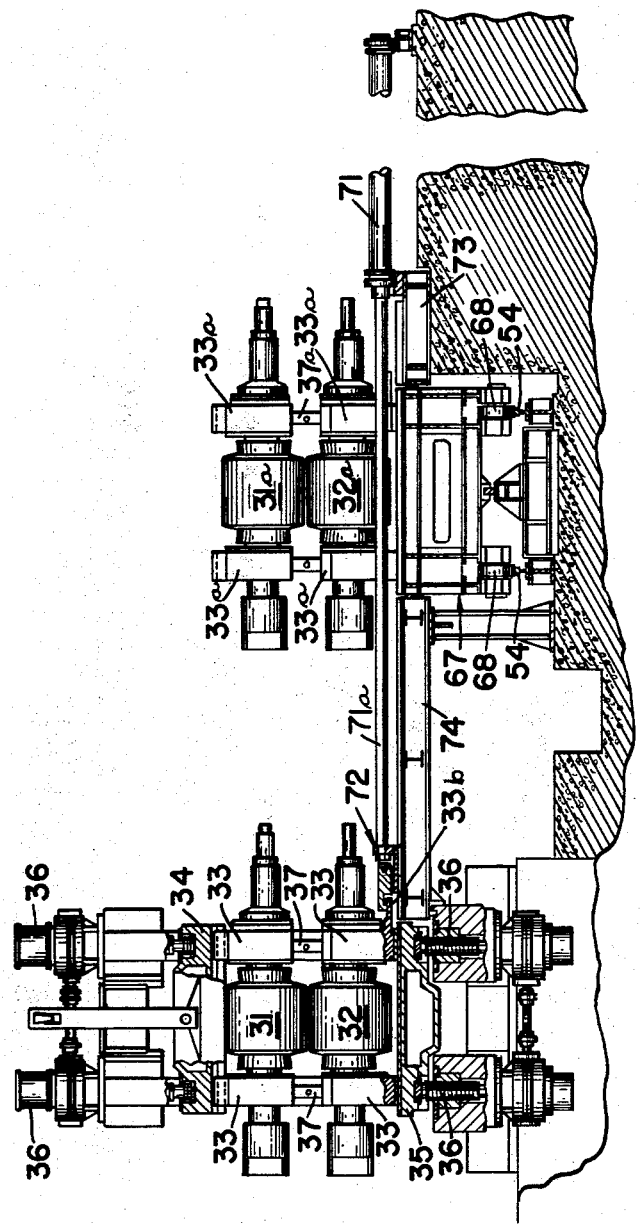
FIGURE 3 is a sectional view taken on lines III—III of FIGURE 1 of the edger mill and its roll changing apparatus.

To facilitate the changing of the rolls 31 and 32 of the edger mill 12, and in reference to FIGURES 1, 3 and 4, the tracks 54 are extended and run slightly past the mill 12. These tracks support a second rig 67 having two pairs of wheels 68. This rig 67 is provided with two platforms 69 and 70 made up of members 71 (shown only in FIGURE 1) for guiding and supporting the pairs of roll assemblies. In the drawings a pair of new roll assemblies 31a, 32a, 33a and 37a are shown resting on the platform 69. Since the location of the lower beam 35 of the edger mill 12 is higher in elevation than the lower beam 26 of the universal mill 11, the platforms 69 and 70 of the rig 67 are built up so that their surfaces will line up approximately with the chock-supporting surfaces of the beam 35. A piston cylinder assembly 71 is provided for retracting from and inserting into the mill the edger roll assemblies. In this respect the construction is similar to the mechanism provided for the lower roll 17 of the universal mill 11. Accordingly, the extended rod 71a of the piston cylinder assembly 71 has secured to it a hook assembly 72 which includes a pivotally mounted hook for engaging a hook 33b formed on the chock 33 of the lower roll 32. The hook 72 is adapted to be retracted clear of the rig 67, where it will rest on a platform 73 during which position the rig can be moved longitudinally relative to the mill. A stationary platform 74 is provided for the same purpose for which platform 64 is provided in connection with the rig 56. As shown in FIGURE 4, the rig 67 is connected to the rig 56 by a connecting member 75 so that these rigs will move in unison and the roll changing operation of both mills 11 and 12 will be performed simultaneously. Stops 76 and 77 are arranged to automatically position the rigs 56 and 67 in the two operative positions.

*Description of roll changing operation*

Prior to discontinuing operation of the universal mill 11 and edger mill 12, the new roll assemblies 16a, 17a, 31a and 32a will be placed upon the respective rigs 44, 56 and 67. In the case of the upper roll for the universal mill 11, the new roll assembly 16a will be placed on the carriage 49 when the carriage is in its retracted position away from the operating side of the mill so that this operation will not disturb the operation of the mill. In the case of the lower roll assemblies for the universal mill 11 and the edger mill 12, the new rolls 17a, 31a and 32a, respectively will be placed on the platforms 58 and 69 of the rigs 56 and 67, respectively, it being understood that just prior thereto the floor plates, which normally cover up the rigs 56 and 67, will have been removed.

Once the operation of the mills has been discontinued and while the mills are being prepared for roll changing, the motor-gear unit 46 is operated to advance the rig 44, hence, the carriages 49 and 50, including the new upper roll assembly 16a to a position show in FIGURES 1 and 3, where it will be noted that the new roll is positioned at one side of the mill and the carriage 50 is lined up relative to the mill. With respect to the new lower roll 17a for the universal mill and the new pair of rolls 31a and 32a for the edging mill, no operation of the cylinder 60 will be necessary, these rolls being placed on the platforms 58 and 69 when they are positioned at one side of the mill so that the unoccupied platforms 57 and 70 of the rigs 56 and 67 are lined up relative to the mill.

Once the roll changing procedure has advanced to this state, the carriage 50 is advanced towards the mill by the operation of the motor-gear unit 51, the piston cylinder assemblies 61 and 71 being also operated. It is to be understood that as a prelude to changing the rolls, the rolls in both mills 11 and 12 will be separated by the operation of screws 23, 36 so that the rolls of each mill will assume a predetermined vertical position. Also with respect to the edger mill, the stools 37 must be inserted between the chocks 33 as shown in FIGURE 4. In the vertical predetermined position the hook 53 of the carriage 50 will engage the hook 29 of the upper roll 16, the hook 63 of the rig 56, the hooks 29 of the lower roll 17 and the hook 72 of the rig 67, the hook 33b of the lower roll 32.

Assuming that all the necessary steps have taken place to permit the withdrawal of the rolls, then the motor-gear unit 51 and the piston cylinder assemblies 61 and 71 are again operated to withdraw the rolls from the mills 11 and 12. In the case of the upper roll 16 of the universal mill 11, the beam 25 will assist in guiding and supporting the roll assembly until its rearward chock 20 comes into engagement with the supporting surfaces 48 of the rig 44. Since the chock-supporting surfaces of the rig are in the proper elevational position relative to the beam, the retraction of the roll assembly will be one continuous movement. With respect to the lower roll assembly 17 of this mill, it will be initially supported and guided by the beam 26 and will pass over the members 66 of the stationary platform 64 and eventually come to rest on the platform 57 of the rig 56. Once this occurs the piston cylinder assembly 61 will be retracted so that its hook 63 will be positioned upon the stationary platform 65 thereby allowing free movement of the rig 56 in a direction parallel to the steel line of the mills.

As to the rolls 31 and 32 of the edger mill 12, once the lower roll 32 has been engaged by the hook 33b which is connected to the rod 71a of the piston cylinder assembly 71, the assembly will be operated to retract the rolls over the stationary platform 74 and come to rest on the platform 70 of the rig 67. After the hook 33b is disengaged from the roll assembly, it will be further retracted to a place over the stationary platform 73 to permit the rig 67 to be advanced.

One the worn rolls have been retracted from the mill, the rigs 44, 56 and 67 will be shifted so as to move the worn rolls 16, 17, 31 and 32 out from the roll receiving positions and automatically position the new rolls 16a, 17a, 31a and 32a into this position for their insertion into the mills. In the case of the upper roll for the universal mill, this operation is performed by operating the motor-gear unit 46 which will move the rig 44 to the proper position. In the case of the lower roll for the universal mill and the two rolls for the edger mill, the operation of the piston cylinder assembly 60 will remove the worn rolls and automatically position the new rolls in the proper position relative to the front of the mills 11 and 12. It will be noted in FIGURE 4 that upon the movement of the carriage 50, there will be no interference between this carriage and the worn set of rolls 31 and 32 which have been removed from the edger mill 12. Once the replacement rolls have thus been positioned, the means employed for retracting the roll assemblies will be operated to automatically insert the rolls into the mills. After this has taken place, the rig 44 can be retracted to its inoperative position permitting the mill 11 to be put back into operation along with the mill 12. The worn rolls can be removed after the mill has resumed production and at the convenience of the operators. As mentioned previously, once the worn rolls have been removed from the rigs 56 and 67, the floor plates may be installed above these rigs.

It will be appreciated from the above that the apparatus illustrated to explain the present invention will accomplish each and every one of the objects earlier set forth, it being particularly noted that not only is the roll changing time for the mills considerably reduced from what was previously experienced, but that the service of a crane or cranes is not required during the actual roll changing operation. Moreover, in view of the fact that the rolls may be brought to the mill prior to the discontinuance of operation, considerable additional time may be saved, in addition to the fact that the roll changing operation after this point need not be made contingent upon the availability of a crane.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:

1. In combination with a rolling mill having at least two rolls in which said rolls are arranged substantially in a common vertical plane,
   a roll changing apparatus comprising a first rig having a first supporting area for receiving a roll withdrawn from the mill and a second area for supporting a replacement roll to be inserted into said mill,
   a substructure supporting said first rig at an elevation substantially coincident with at least a portion of the upper-most roll,
   said first rig being arranged so that its first and second supporting areas can be brought into an operative receiving and inserting position, respectively, relative to the upper-most roll of said mill,
   a second rig having a first supporting area for receiving a roll withdrawn from the mill and a second area for supporting a replacement roll to be inserted into the mill,
   said second rig being arranged to pass beneath the first rig at an elevation substantially coincident with at least a portion of the lower-most roll,
   said second rig being arranged so that its first and second supporting areas can be brought into their receiving and inserting positions, respectively, relative to the lower-most roll of said mill, and
   means for moving said rigs longitudinally relative to said mill to locate said first roll-supporting areas in positions to receive rolls withdrawn from the mill and for further moving said rigs so that the withdrawn rolls will be removed away from said receiving positions and the replacement rolls supported by said second roll-supporting areas positioned relative thereto in readiness for insertion into the mill.

2. A roll changing apparatus according to claim 1 wherein said substructure is arranged so that the first rig can be brought to a roll storage position away from the roll receiving position of said mill.

3. A roll changing apparatus according to claim 1 wherein said area of said second rig for supporting a replacement roll can be brought to a roll storage position away from the roll receiving position of the mill.

4. A roll changing apparatus according to claim 1 in which said mill includes a horizontal projection extending in a direction of a plane containing the axes of the rolls,
   said projection constituting a portion of said substructure and serving to support said first rig during at least a portion of its longitudinal movement relative to said mill.

5. A roll changing apparatus according to claim 1 including a pair of carriages supported by said first and second roll-supporting areas of said first rig,
   means for advancing said carriages in a direction to withdraw from and insert rolls into the mill.

6. In combination with a rolling mill having a fixed housing, including at least two roll assemblies in which said rolls are arranged with their axes in a common vertical plane,
   means for adjusting said upper roll relative to said lower roll,
   drive means arranged on one side of said mill for driving at least one of said rolls,
   said mill further including means extending axially for supporting the upper roll assembly during its passage through and relative to said fixed housing when the upper roll assembly is being changed,
   said means for supporting said upper roll assembly movable therewith when said upper roll assembly is adjusted by the roll adjusting means,
   said mill including a second means for supporting said upper roll assembly having a portion overhanging the outer end thereof when the upper roll assembly is in its operative position in the mill, said second supporting means extending from the side of said mill opposite the side on which said drive means is located, a roll changing apparatus comprising a rig having a first supporting area for receiving said upper roll assembly withdrawn from the mill and a second area for supporting a replacement roll assembly to be inserted into the mill, said rig being arranged so that said first and second supporting areas thereof can be brought into their receiving and inserting positions, respectively, relative to the mill and at such an elevation that in the withdrawal and insertion of said upper roll assembly, the upper roll assembly will be continuously supported alternately by the said first and second supporting means of the mill and by one of the supporting areas of the rig, and means for longitudinally moving said rig relative to said mill to locate one of its roll-supporting areas in position to receive an upper roll assembly withdrawn from the mill and for further moving said rig so that the withdrawn upper roll assembly will be removed away from the said receiving position and the replacement roll assembly supported by said second supporting area of said rig positioned relative thereto in readiness for insertion into the mill.

References Cited by the Examiner
UNITED STATES PATENTS

| | | | |
|---|---|---|---|
| 661,470 | 11/00 | Fawell et al. | 80—1.3 |
| 749,745 | 1/04 | Philp | 80—1.3 |
| 1,935,091 | 7/32 | Iverson | 80—1.3 |

FOREIGN PATENTS 1,251,984  12/60  France.

CHARLES W. LANHAM, *Primary Examiner.*